US012527891B2

(12) United States Patent
Kun et al.

(10) Patent No.: US 12,527,891 B2
(45) Date of Patent: Jan. 20, 2026

(54) SYSTEM AND METHOD FOR SAFELY AND EFFICIENTLY DISINFECTING AIR IN A ROOM

(71) Applicant: Excelitas Canada, Inc., Vaudreuil-Dorion (CA)

(72) Inventors: Jessica Kun, Mississauga (CA); Hsin-Chin Lee, Mississauga (CA); Marvin Ruffin, Chicago, IL (US)

(73) Assignee: Excelitas Canada, Inc., Vaudreuil-Dorion (CA)

( * ) Notice: Subject to any disclaimer, the term of this patent is extended or adjusted under 35 U.S.C. 154(b) by 318 days.

(21) Appl. No.: 18/329,275

(22) Filed: Jun. 5, 2023

(65) Prior Publication Data

US 2023/0390447 A1    Dec. 7, 2023

Related U.S. Application Data

(63) Continuation of application No. PCT/US2021/062374, filed on Dec. 8, 2021.

(60) Provisional application No. 63/122,579, filed on Dec. 8, 2020.

(51) Int. Cl.
*A61L 9/20* (2006.01)

(52) U.S. Cl.
CPC ............ *A61L 9/20* (2013.01); *A61L 2209/111* (2013.01); *A61L 2209/12* (2013.01)

(58) Field of Classification Search
None
See application file for complete search history.

(56) References Cited

U.S. PATENT DOCUMENTS

| 9,370,600 | B1* | 6/2016 | DuPuis | ................... F21V 14/08 |
| 2007/0053188 | A1 | 3/2007 | New et al. | |
| 2016/0175475 | A1* | 6/2016 | DuPuis | ..................... A61L 9/20 |
| | | | | 250/504 R |

FOREIGN PATENT DOCUMENTS

| CN | 205095067 U | * | 3/2016 | ............. A61L 9/015 |
| CN | 111265706 A | * | 6/2020 | ............... A61L 9/20 |
| CN | 111282012 A | | 6/2020 | |

OTHER PUBLICATIONS

International Search Report and Written Opinion mailed May 3, 2022 for International Application No. PCT/US2021/062374.
International Preliminary Report on Patentability for International Application No. PCT/US2021/062374 mailed Jun. 22, 2023.

* cited by examiner

*Primary Examiner* — Andrew Smyth
(74) *Attorney, Agent, or Firm* — Wolf, Greenfield & Sacks, P.C.

(57) ABSTRACT

An ultraviolet C (UVC) unit, comprises a Light Emitting Diode (LED) module containing a series of UVC LEDs that provide UVC emission, a lens that linearly focuses the UVC emission of the LED module and a controllable baffle that directs UVC light that passes from the LED module through the lens. The UVC light emitted from the LED module is directed toward the lens for linearly focusing the emission of the LED module in order to propagate the light throughout a top portion of a room in which the UVC unit is positioned, when the baffle is in a first position, and wherein the light is propagated downward from the UVC unit when the baffle is in a second position.

17 Claims, 11 Drawing Sheets

SYSTEM AND METHOD FOR SAFELY AND EFFICIENTLY DISINFECTING AIR IN A ROOM

CROSS-REFERENCE TO RELATED APPLICATIONS

This application claims priority under 35 U.S.C. § 120 to and is a continuation of International Application No. PCT/US2021/062374, filed Dec. 8, 2021, entitled "System and Method for Safely and Efficiently Disinfecting Air in a Room," which claims the benefit of U.S. Provisional Patent Application No. 63/122,579, filed Dec. 8, 2020, entitled "System and Method for Safely and Efficiently Disinfecting Air in a Room," each of which is incorporated by reference herein in its entirety.

FIELD

The present invention relates to air and surface disinfection, and more particularly, is related to a system for safely and efficiently disinfecting air and surfaces in a room.

BACKGROUND

Providing and maintaining a clean environment is not only desirable, but necessary. An unclean environment can be welcoming to and/or allow for the transmission of viruses, bacteria, parasites, and other pathogens. Different technologies have been created in an attempt to reduce the life cycle of a pathogen, remove pathogens, and reduce chances for transmission, especially in restaurants, airports, clinics, hospitals, dental offices, shopping centers, and other high traffic areas.

As is known by those having ordinary skill in the art, ultraviolet C (UVC), one category of three ultraviolet light categories including UVA, UVB, and UVC, refers to ultraviolet light having wavelengths between 200-280 nanometers (nm). FIG. 1 is a prior art image illustrating the bandwidth of different light, including the UVC range. Light in the UVC wavelength can be used for sterilizing surfaces, destroying harmful micro-organisms in food products and in air, and disinfecting water. The effectiveness of UVC light comes from the ability of the light to destroy the genetic information in the DNA, thereby causing micro-organisms to lose their reproductive capability, leading to their destruction.

While effective in disinfecting, UVC light is also hazardous to the health of individuals exposed to UVC light. For example, UVC light can burn exposed skin and damage the retina of an individual exposed to UVC light. As a result, UVC light sterilization is typically performed when people are not in the vicinity of UVC light. Portable UVC robots or machines have been created to be placed within a room, turned on with nobody within the room, and allowed to sanitize areas in which emitted UVC light travels. Unfortunately, such systems are very inefficient and time-consuming to use, especially since a person has to evacuate the room, transport the UVC machine into the room, leave the room, turn on the UVC machine, allow the UVC machine to emit UVC light for a period of time, and then re-enter the room to retrieve the UVC machine. It is also known that the UVC light only sanitizes that with which the UVC light comes in contact, making the transported UVC machine inefficient and potentially ineffective in areas lacking in line-of-sight vision just above-ground level, such as due to furniture or dividing walls, such as for cubicles where employees work.

Portable UVC light sanitizing robots or machines also do not stop working when a person enters a room in which the machine is located. Such inability to detect presence of an individual potentially places that entering individual in the way of harm. Therefore, it is also desirable to allow the UVC light sanitizing robots or machines to function only when there is no imminent threat to an individual located within a hazardous distance of the robot or machine.

UVC light producing devices have also been used within buildings to emit UVC light into an upper air zone, in an attempt to sanitize air. Such devices create an upper air UVC zone that can be maintained within a building at an elevation that is high enough not to be a health hazard to occupants of the building. Unfortunately, while helpful, such systems are not very efficient since they are limited to maintaining UVC light in an upper air zone, and not lower where additional disinfection is desired. In addition, such systems do not have safety measures to ensure that an installed UVC light emitting system does not shift in position resulting in emitted UVC light entering into a region populated by people, resulting in bringing harm to occupants of a room.

Therefore, there is a need for a more efficient and automatically controllable UVC light emitting system that takes all of these factors and more under consideration and addresses them to provide a safe environment.

SUMMARY

Embodiments of the present invention provide a system and method for safely and efficiently disinfecting air in a room. Briefly described, an ultraviolet C (UVC) unit, contains a Light Emitting Diode (LED) module having a series of UVC LEDs that provide UVC emission; a lens that linearly focuses the UVC emission of the LED module; and a controllable baffle that directs UVC light that passes from the LED module through the lens, wherein UVC light emitted from the LED module is directed toward the lens for linearly focusing the emission of the LED module in order to propagate the light throughout a top portion of a room in which the UVC unit is positioned, when the baffle is in a first position, and wherein the light is propagated downward from the UVC unit when the baffle is in a second position.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Figure 1:
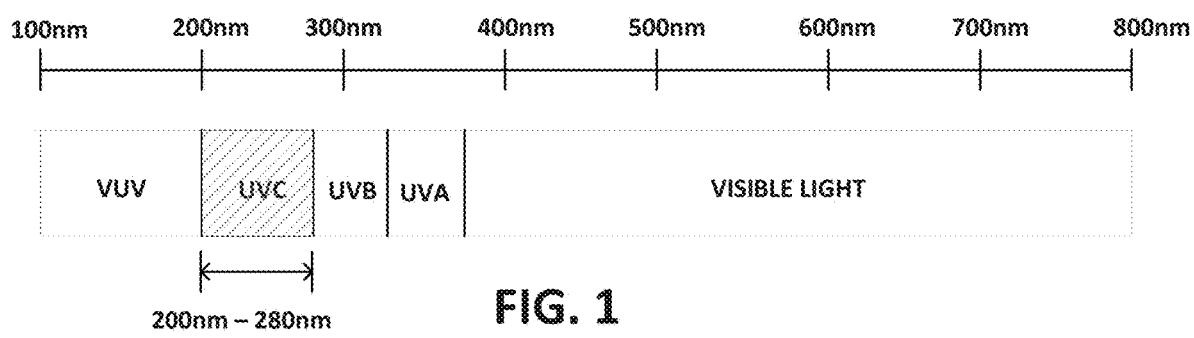
FIG. 1 is a prior art image illustrating the bandwidth of different light, including the UVC range.

Reference will now be made in detail to embodiments of the present invention, examples of which are illustrated in the accompanying drawings. Wherever possible, the same reference numbers are used in the drawings and the description to refer to the same or like parts.

The present system and method is embodied within a UVC transmission fixture unit (hereafter, "UVC Unit"). The present UVC Unit addresses the many disadvantages of present UVC light dispensing units, as previously disclosed within the background, by utilizing a number of sensors to ensure that UVC light is controlled so as not to expose room occupants to hazardous UVC light, yet maximize use of UVC light emitted by the UVC Unit.

Figure 2A:
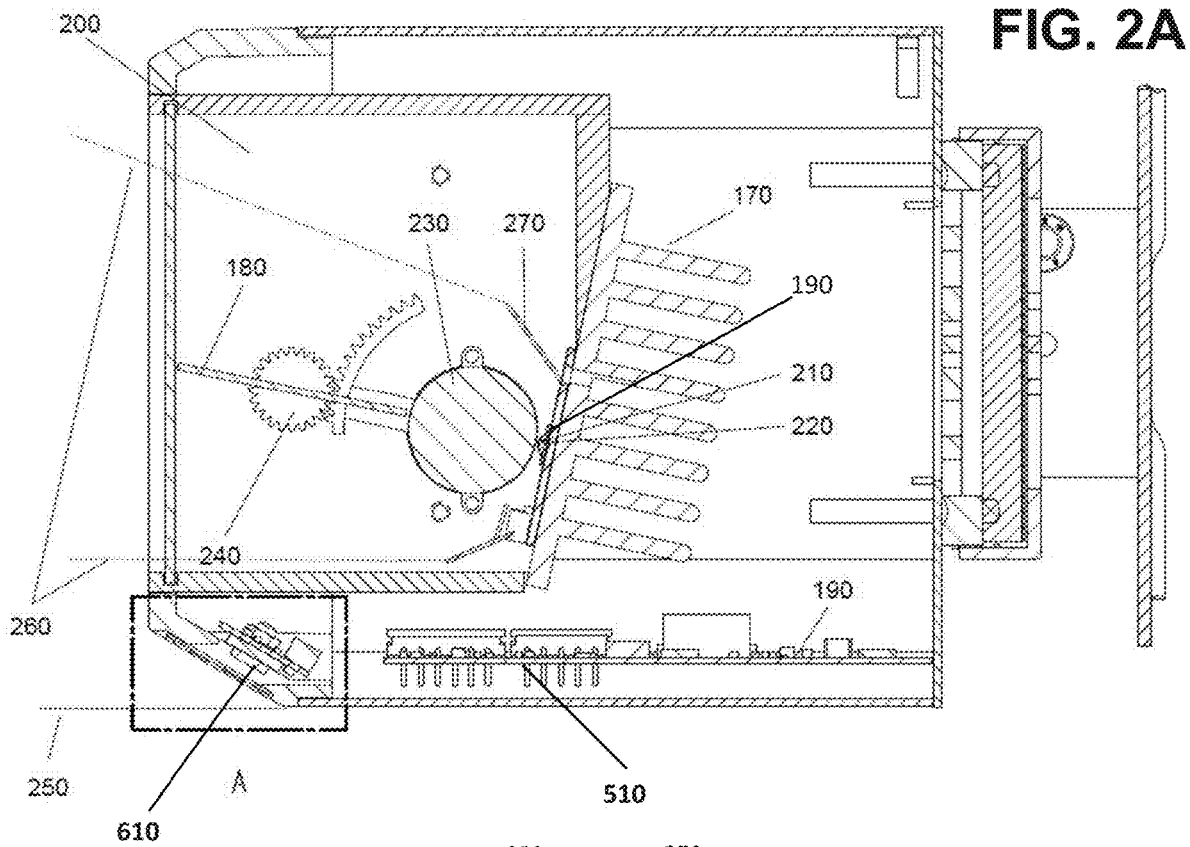
FIG. 2A is a cross-sectional diagram illustrating the present UVC Unit in accordance with a first exemplary embodiment of the invention, where a baffle is in a first position.
Figure 2B:
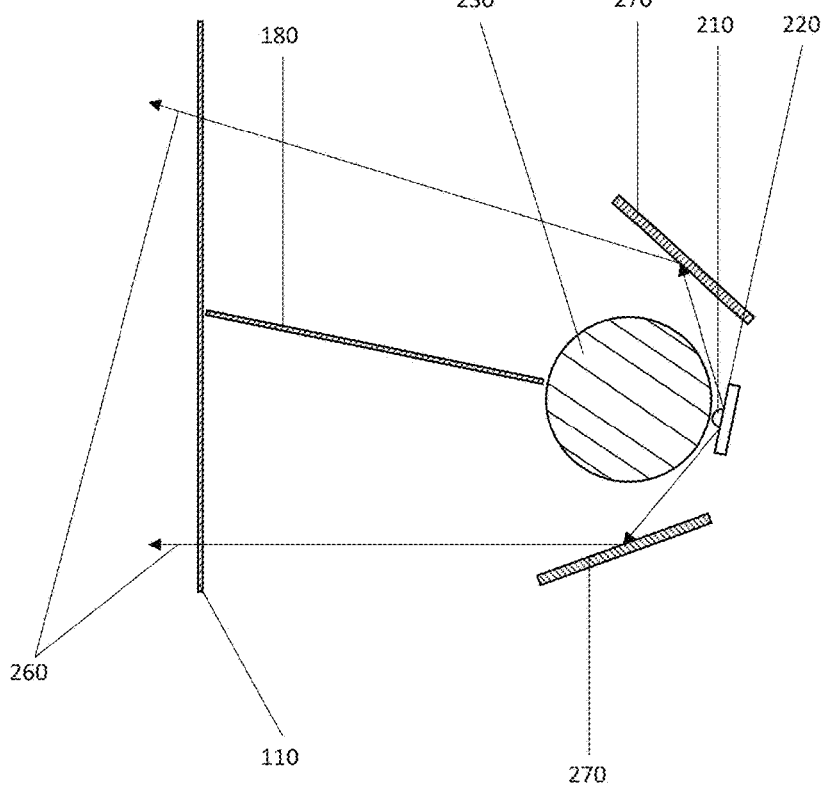
FIG. 2B is a schematic diagram illustrating UVC light reflection in the UVC Unit of FIG. 2A.
Figure 2C:
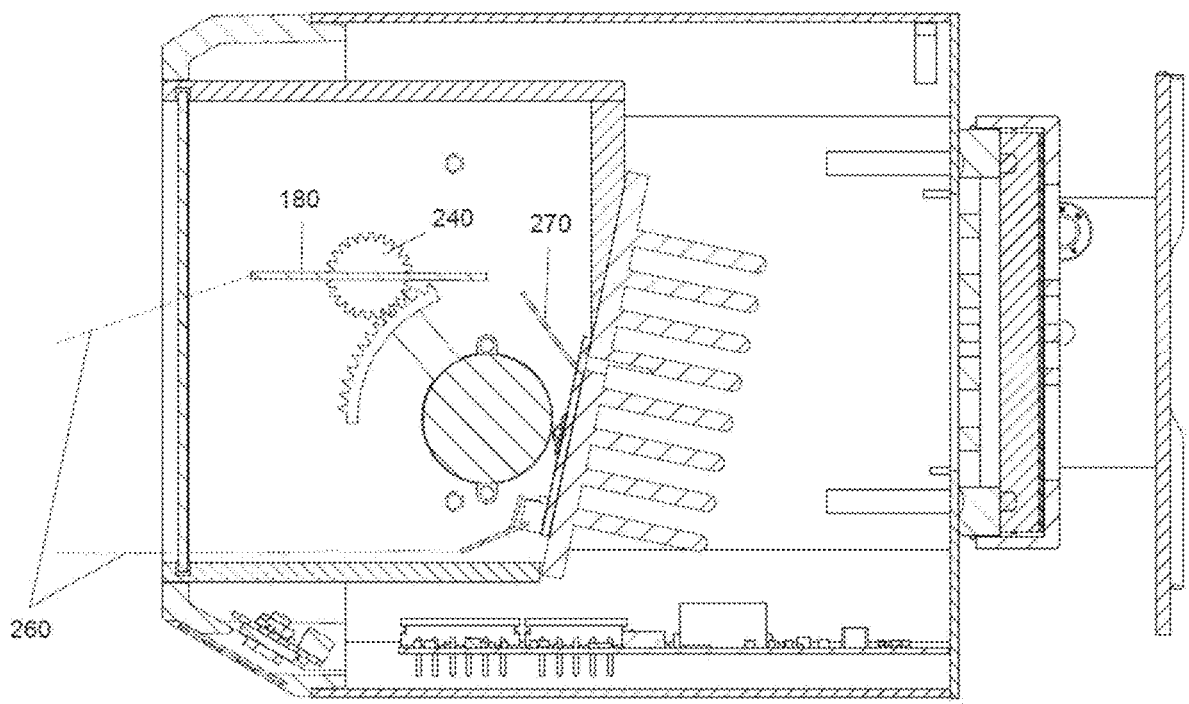
FIG. 2C is a cross-sectional diagram illustrating the present UVC Unit in accordance with the first exemplary embodiment of the invention, where the baffle is in a second position.

FIG. 2A is a cross-sectional diagram illustrating the present UVC Unit 100 in accordance with a first exemplary embodiment of the invention, where a baffle 180 is in a first position providing horizontal UVC light emission. Alternatively, FIG. 2C is a cross-sectional diagram illustrating the present UVC Unit 100 in a second position providing downward UVC light emission. The baffle 180 first and second positions, as well as associated functionality, are described in detail hereinafter.

As shown by FIG. 2A, the UVC Unit 100 contains an optics box 200 that is used to create the UVC light and to direct the light at appropriate times to specific locations, as explained in detail hereafter, through a window 110. The window 110 is a panel of clear material such as, but not limited to, glass or fused silica glass (which is transparent in the UVC range), and it allows optics within the UVC Unit 100 to remain clean and dust free.

Figure 3A:
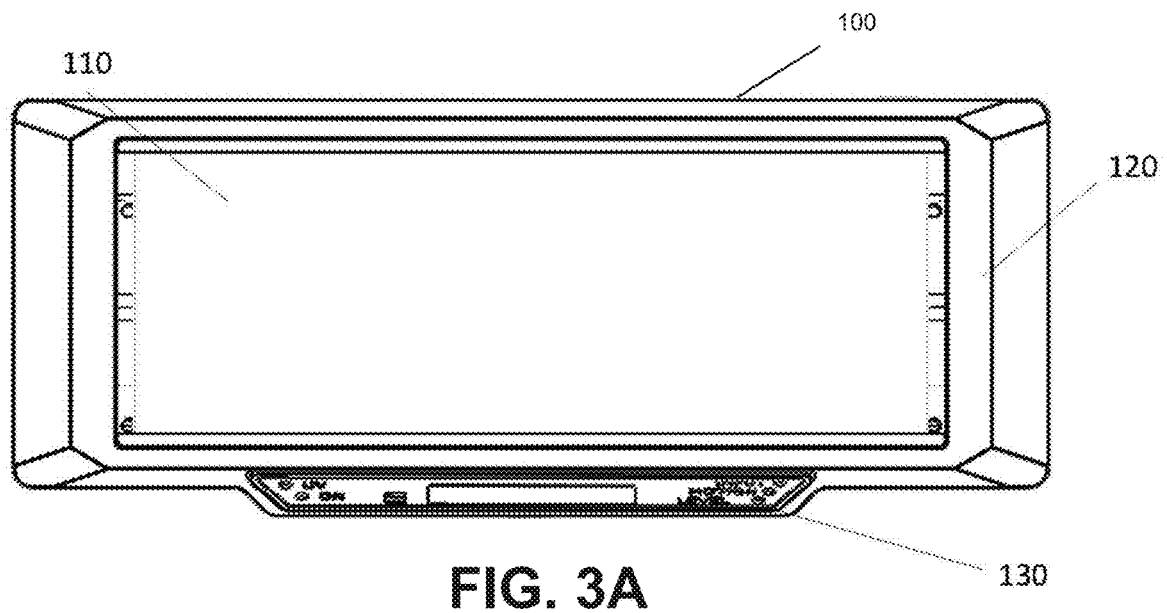
FIG. 3A is a schematic diagram illustrating the exterior of the UVC Unit, viewed from the side of the window, also referred to as a front view.

FIG. 3A is a schematic diagram illustrating the exterior of the UVC Unit 100, viewed from the side of the window 110, also referred to as a front view. It is noted that this example of the UVC Unit 100 exterior is merely provided for exemplary purposes and is not intended to limit size, shape, or dimensions of the UVC Unit 100. The UVC Unit 100 contains a wall mount fixture 160 for allowing the Unit 100 to be mounted on a wall at an elevated location. The wall mount fixture 160 can be any known wall mounting system, as long as the UVC Unit 100 is securely maintained in position, although it is noted that the present UVC Unit 100 contains sensors and logic to prevent the UVC Unit 100 from providing a hazardous situation to a room occupant should the Unit 100 shift from its mounted position. Alternatively, while mounting to a wall at an elevated location is preferred, the Unit 100 may instead be connected to a stand at an elevated location. The UVC Unit 100 may be positioned or mounted on a wall or other surface, as long as it is in an elevated location above a height that a person may walk within the room in which the UVC Unit 100 is located.

Referring to FIG. 3A, the Unit 100 contains a fascia 120, which maintains the window in its secured position. A control panel is also located on an exterior of the Unit 100. Location of the control panel is not a novelty of the Unit 100 and therefore, the location need not be on the bottom of the Unit 100 underneath the window 110, but may instead be located on the left or right side, or a different location. The control panel 130 allows a user of the Unit 100 to select different options or modes of the Unit 100 as described herein. Information displayed on the control panel 130 includes an indication as to whether UV light is being emitted, whether the Unit 100 is on, whether the Unit 100 is connected to the power source, the status of the presence sensor (on/off indication) and the Unit's perpendicularity to ensure correct orientation upon installation.

Figure 3B:
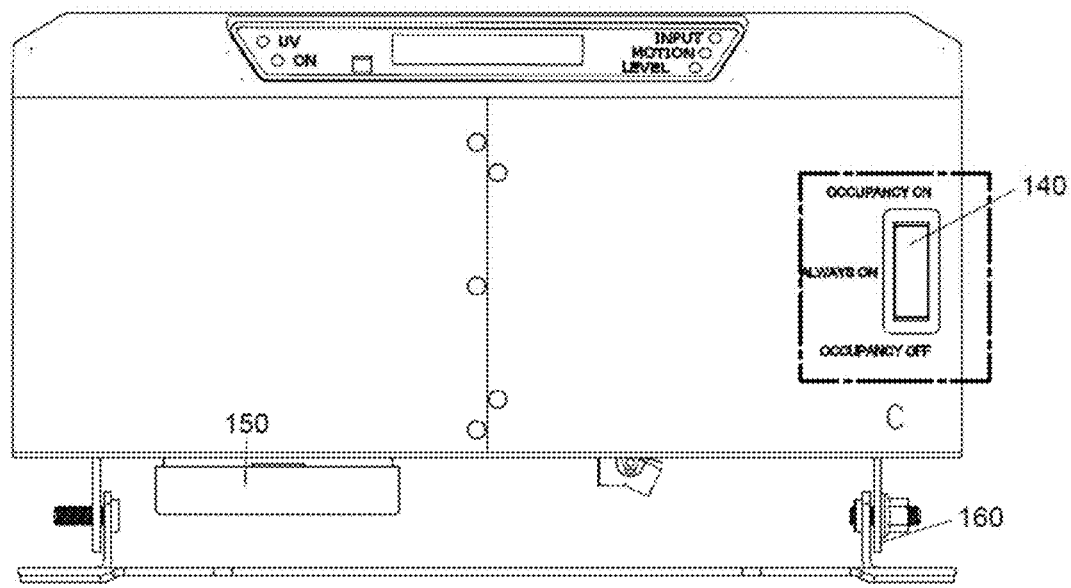
FIG. 3B is a schematic diagram illustrating the exterior of the UVC Unit, providing a bottom view.

FIG. 3B is a schematic diagram illustrating the exterior of the UVC Unit 100, providing a bottom view. As shown by FIG. 3B, the Unit 100 contains a switch 140, for allowing a user to choose from an occupancy on mode, an occupancy off mode, and an always on mode. In the occupancy on mode the Unit 100 remains on when it detects occupants in the room. In the occupancy off mode the Unit 100 turns off if an occupant enters the room and it remains off while the room is occupied, turning on when the occupant leaves. Finally, the Unit 100 may be in an always on mode where the Unit 100 is on regardless of whether the room is occupied or not. A fan 150 may be located on the UVC Unit 100 for cooling the Unit 100. In one exemplary embodiment, the fan 150 is located on a lower part of the UVC Unit 100, although this need not be the location.

Figure 4A:
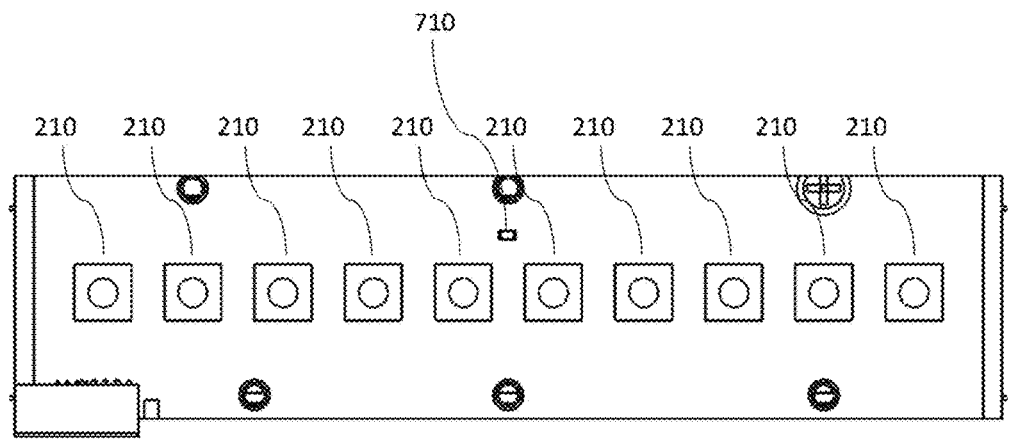
FIG. 4A shows an array of UVC LEDs only containing UVC LEDs.
Figure 4B:
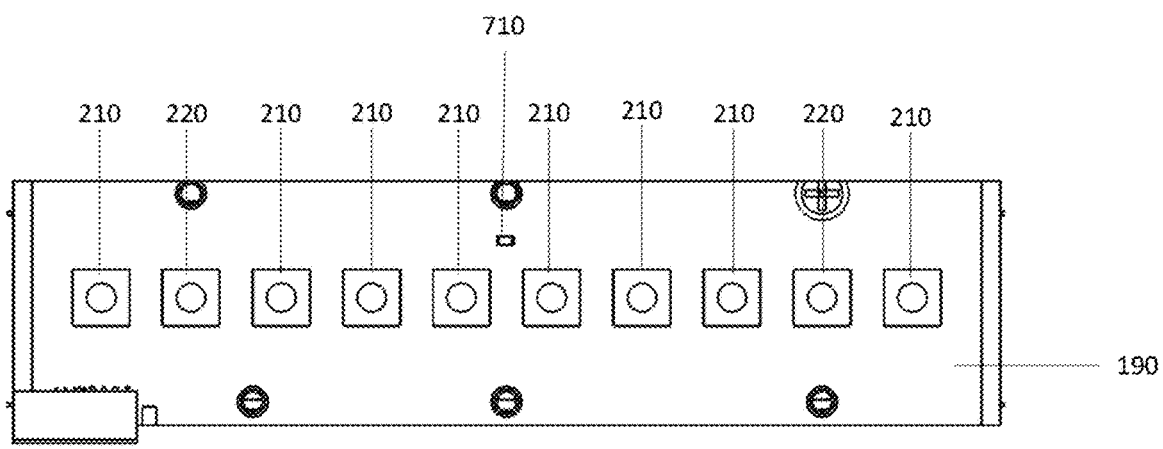
FIG. 4B shows an array of UVC LEDs containing UVC LEDs and RGB LEDs.

Returning to FIG. 2A, UVC light created within the optics box 200 originates from a light emitting diode (LED) module 190 containing a series of UVC LEDs 210 and a series of RGB LEDs 220. Exemplary embodiments of the LED array 205 are shown by FIGS. 4A and 4B. In both FIGS. 4A and 4B a temperature sensor 710 is located within the LED module 190 for monitoring temperature of the LED module 190 so as to allow the UVC unit 100 to determine if the LED module 190 is overheating. The presence of UVC LEDs allows for fast switching on and off of the UVC unit 100 since LEDs have fast switching capability.

The schematic diagram of FIG. 4A shows an array of UVC LEDs 210. While ten UVC LEDs 210 are displayed, more, or fewer may be used. In addition, arrangement of the UVC LEDs 210 may differ from the linear arrangement of FIG. 4A. As is known by those having ordinary skill in the art, UVC light is not visibly detectable. As a result, to assist a user of the UVC Unit 100 and those entering a room in which the Unit 100 is working, or those monitoring use of the Unit 100 itself, in accordance with an alternative embodiment of the invention, the LED module 190 of FIG. 4B may also contain RGB LEDs 220 which are turned on with the UVC LEDs 210 so as to project visible light into the room so as to allow potential and current occupants of the room to know that the UVC Unit 100 is on and emitting UVC light into the room.

Returning to FIG. 2A, another measure provided within the UVC Unit 100 to prevent overheating is a heat sink 170 located on a back portion of the LED module 190. Fins of the heat sink 170 extend outward and away from the lens 230 allowing heat of the LED module 190 to be distributed and dissipate.

Returning to FIG. 2A, UVC light emitted from the LED module 190 is directed toward a lens 230 for linearly focusing the emission of the LED module 190 in order to propagate the light throughout the top portion of the room when the baffle is in the first position, directing it away from room occupants and the ceiling. In accordance with one exemplary embodiment, the lens 230 may be a single cylindrical lens which can be seen in FIGS. 5A and 5B. The lens 230 is held along the length of the LED module 190, which is behind the lens 230. The cylindrical lens may be, for example, but not limited to, a fused silica cylindrical lens.

As shown by FIG. 2A, the UVC Unit 100 contains a reflector 270 that is positioned to direct the UVC light out of the optics box 200. Specifically, in accordance with one embodiment of the invention, the reflector 270 may surround a portion of the lens 230 so as to efficiently reflect UVC light from the lens 230 away from the reflector 270, forward and out of the optics box 200. A better illustration of the UVC light reflection is illustrated by FIG. 2B.

The reflector 270 of FIG. 2A is concave in shape. It is noted that in accordance with an alternative embodiment of the invention, multiple reflectors may be used, or a differently shaped reflector, to angle the UVC light out of the optics box 200, as opposed to having a single unit reflector 270 that is angled and c-shaped.

The UVC Unit 100 also contains a baffle 180 that is controllable to assist in directing UVC light that passes from the LED module 190 through the lens 230. The baffle 180 is placed behind the window 110 and along the optical axis to allow for easy cleaning. The baffle 180 is also made of a material that deflects UVC light or may simply have a coating that deflects UVC light. Non-limiting examples of such materials may include, but are not limited to, black anodized aluminum. Alternatively, the baffle 180 can be made from two materials to further improve the efficiency, reflective on top, and absorbing on the bottom. This results in a higher efficiency in comparison to a standard baffle. Specifically, the reflective characteristic of the baffle 180 on the top allows for reflection of UVC light when necessary to reflect downward from a horizon of the UVC Unit 100, as described herein, while absorbing properties of the bottom portion of the baffle 180 minimize stray light so as to increase efficiency of the Unit 100. If the bottom of the baffle 180 were reflective it would cause too much stray light to enter the room in its resting position (FIG. 5A) and the occupants would be hit by this stray light. In accordance with the example of FIGS. 5A and 5B, the mechanism that the baffle 180 is on rotates it as it lifts the baffle 180 upwards so that what was formerly the top of the baffle in FIG. is then the bottom of the baffle 180 in FIG. 5B.

Figure 5A:
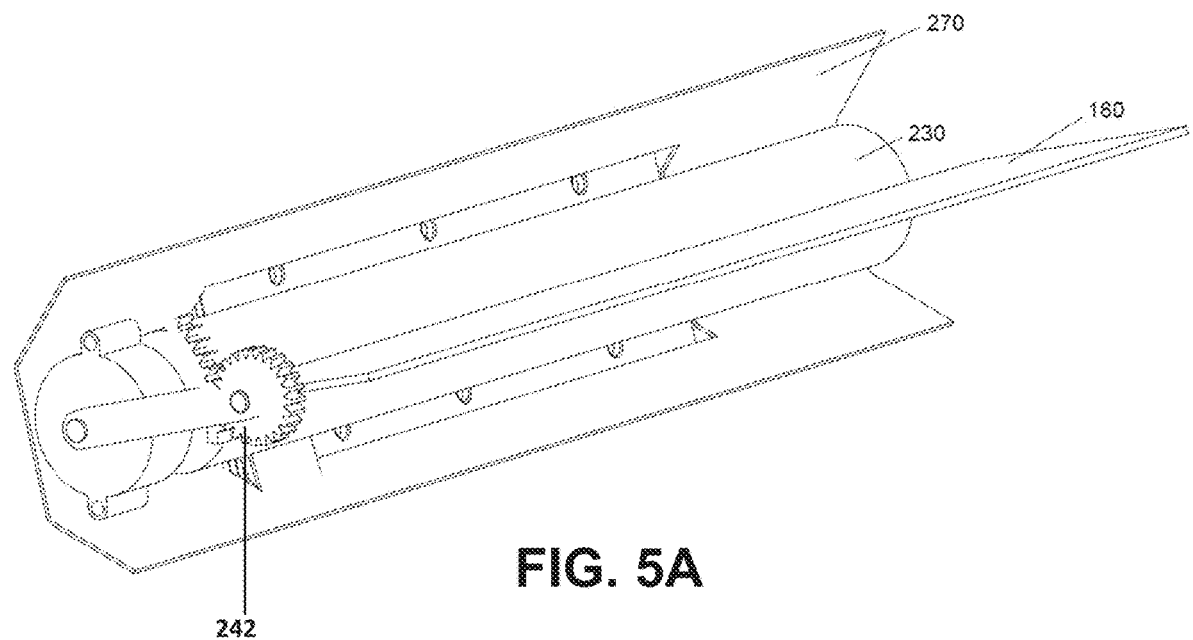
FIGS. 5A and 5B are schematic diagrams illustrating an example of a system for executing functionality of the present invention.

The controllable baffle 180 can be placed in multiple positions so as to direct emitted UVC light out of the optics box 200 in a direction that is dependent upon position of the baffle 180. The controllable baffle 180 is shifted in position by a baffle motor system 240, that moves the baffle 180 under certain circumstances, as described herein, so as to direct UVC light downward of the UVC Unit 100 horizontal 250 at the proper time. For example, FIG. 5A illustrates the UVC Unit 100 where the baffle 180 is in a first position, or resting position, so as not to reflect UVC light downward of the UVC Unit 100 horizontal 250 by interfering with UVC light leaving the lens 230. Specifically, presence of a single smart/controllable baffle 180 placed along the optical axis of the UVC Unit 100 eliminates stray light below a horizon 250 of the Unit 100, while maintaining a higher efficiency in comparison to current lamp-based systems on the market with a louver for eliminating stray light.

Figure 5B:
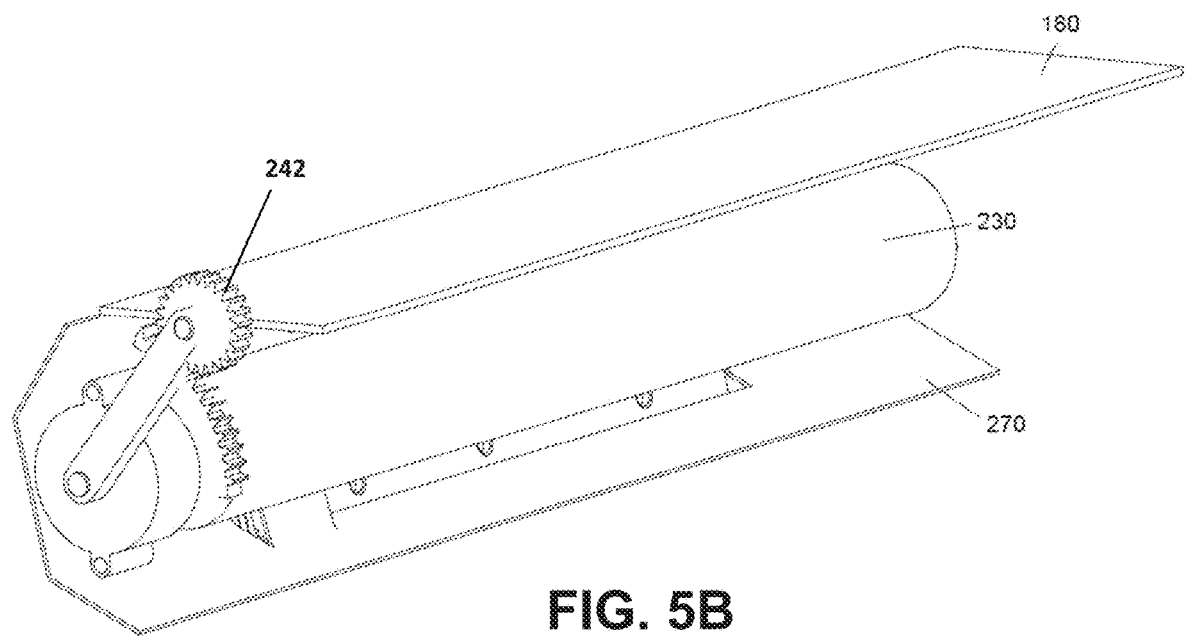

FIG. 5B illustrates the UVC unit 100 where the baffle 180 has been shifted to a second position so as to reflect UVC light downward below the UVC Unit's horizon 250 so that the UVC Unit 100 can direct UVC light into areas typically traversed by people when the room is unoccupied, as determined by sensors of the Unit 100. As will be explained in further detail below, the controllable baffle 180 allows certain circumstances to result in the change in position of the baffle 180, resulting in UVC light either being emitted in an upper region of a room, where the UVC Unit 100 is located, such as represented by the illustration of FIG. 2A, or deflected downward into the room, as represented by the illustration of FIG. 2C.

The baffle motor system 240 may be one of many different motor systems that allows for movement of the baffle 180 when instructions for movement are received. An example of such a motor system is shown in FIG. 2A and FIG. 2C, as well as FIG. 5A and FIG. 5B. The motor system 240 illustrated uses gears to cause the baffle 180 to move from a first position that is aligned with direction of the UVC light passing through the lens 230 (FIG. 2A), to a second position, where the baffle 180 is above and partially in the path of UVC light that has passed through the lens 230, causing reflection of the UVC light downward from the UVC Unit 100. In the example of FIGS. 2A, 2C, 5A, and 5C, the baffle motor system 240 contains a motor that causes a wheel 242 having teeth to rotate in a direction to cause the teeth of the wheel portion to fit within grooves of a receiving portion of the baffle motor system 240. By rotating clockwise, the wheel 242 causes the teeth of the wheel 242 to traverse the receiving grooves of the baffle motor system 240, and the baffle 180 is moved upward, as well as rotated. Likewise, by rotating counter-clockwise, the wheel 242 causes the teeth of the wheel 242 to traverse the receiving grooves of the baffle motor system 240 and move the baffle 180 downward. Since the baffle 180 is connected to the wheel 242, movement of the wheel 242 results in movement of the baffle 180.

The degree or angle of UVC air emission from the UVC Unit 100 may be adjusted by adjusting location of the baffle 180. As a result, logic provided within the UVC Unit 100, as described herein, takes into consideration responses received from a number of sensors, to determine in which location the baffle 180 should be positioned, resulting in instruction being provided to the baffle motor system 240 to either maintain position of the baffle 180, or adjust position accordingly.

One having ordinary skill in the art would appreciate that the baffle motor system 240 need not have the exact configuration of the example demonstrated by the present figures, as long as the baffle motor system 240 has the ability to shift position of the baffle 180 to result in the UVC light shifting in emission from the optical box 200 from an upward position, to an angled downward position. It is noted that the baffle motor system 240 need not shift only between two baffle 180 positions, but instead, my shift between many baffle positions that are preprogrammed within the UVC Unit 100.

Figure 6:
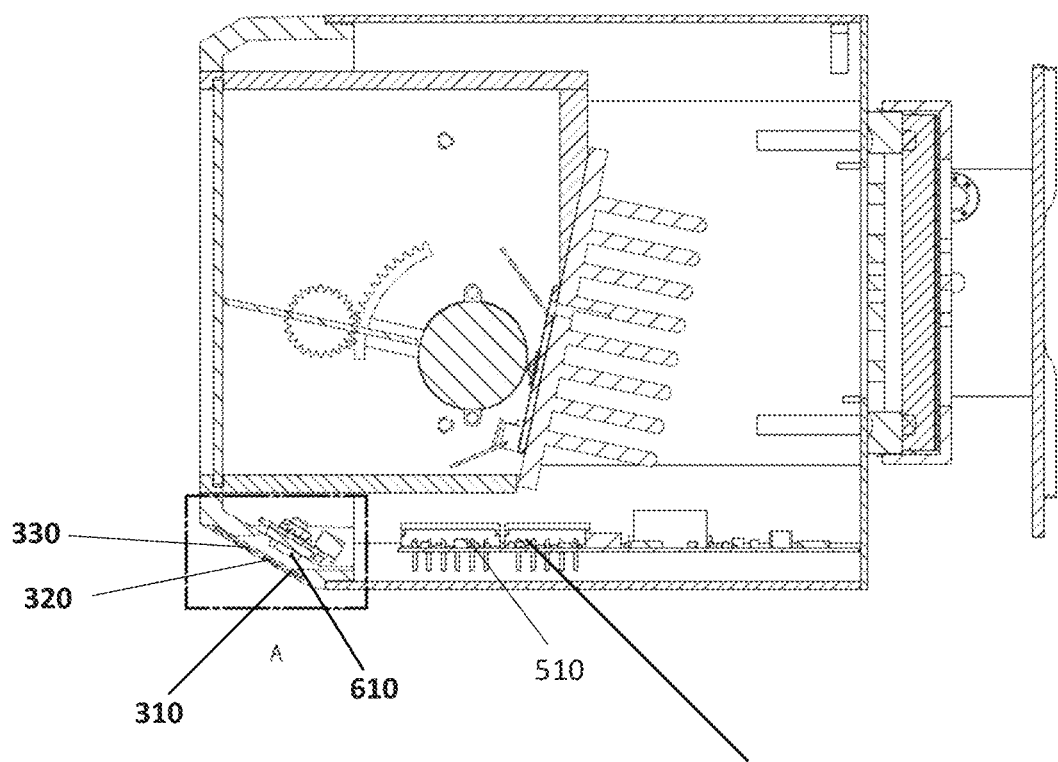
FIG. 6 is a schematic diagram illustrating the UVC Unit of FIG. 2A with sensors highlighted.

The UVC Unit 100 also contains a printed circuit board (PCB) 190 on which logic may be located for providing instruction to the UVC Unit 100 based on data received by sensors. FIG. 6 is a schematic diagram illustrating the UVC Unit of FIG. 2A with sensors highlighted. As shown by FIG. 6, the UVC Unit 100 contains a presence/motion sensor 310, an optical distance ranging sensor 320, distance ranging sources 330, an angular sensor 510, a CO2 sensor 610 and the temperature sensor 710 previously mentioned. The presence/motion sensor 310 may be any known presence/motion sensor 310, and is used to determine if a person is occupying the room in which the UVC Unit 100 is located, as well as where in the room the person is located. The CO2 sensor 610 is used to determine the number of people occupying the room in which the UVC Unit 100 is located. The CO2 sensor 610 detects carbon dioxide concentration in the room to figure out how many people are in the room to control the UVC emission intensity and running time. By using both the presence/motion sensor 310 and the CO2 sensor 610, the UVC Unit 100 determines if the room in which the UVC Unit 100 is located is occupied by a person, as well as where that person is located. Since both of these types of sensors are known to those having ordinary skill in the art, additional description of the sensors, is not provided herein.

The optical distance ranging sensor 320 allows the UVC Unit 100 to determine size and dimensions of the room in which the sensor 320 is located. By knowing size and dimensions of the room, the UVC Unit 100, via an internal processor, can determine how much UVC light is necessary to disinfect the room and can turn on and off the UVC Unit 100 accordingly. In addition, the UVC Unit 100 can determine where in the room is a safe place for projection of UVC light, even if the room is occupied. Specifically, sensors of the UVC Unit 100 allow for determining specifically what the size and dimensions of the room are, how many occupants are in the room, and where they are located. Therefore, the UVC Unit 100 can in real time project UVC light downward into the room in areas where there are no occupants.

The angular sensor 510 provides a safety feature to allow detection of the UVC Unit 100 tilting down due to a wrong installation or any other reasons that would result in a hazard to room occupants. The angular sensing feature defines a safe tilting range for turning on UVC light emission, and can be used to prevent turning on UVC LEDs if out of the safety range. Distance ranging sources include:
 1. Infrared or visible LED
 2. Infrared or visible Laser
 3. Infrared VCSEL
 4. Infrared structured light
 5. Visible structured light
 6. Ultrasound For sources 1 to 3 and 6, based on ToF (Time-of-Flight) technology, the sensor will measure signal strength and can be affected by the object's reflectivity, sensor directly measure distance to the object based on the time for emitted photons to be reflected.

For sources 4 and 5, the target object can be illuminated with structured light, a single line or a pattern of lines use a 2D image sensor (camera) to detect the reflected pattern.

Figure 7:
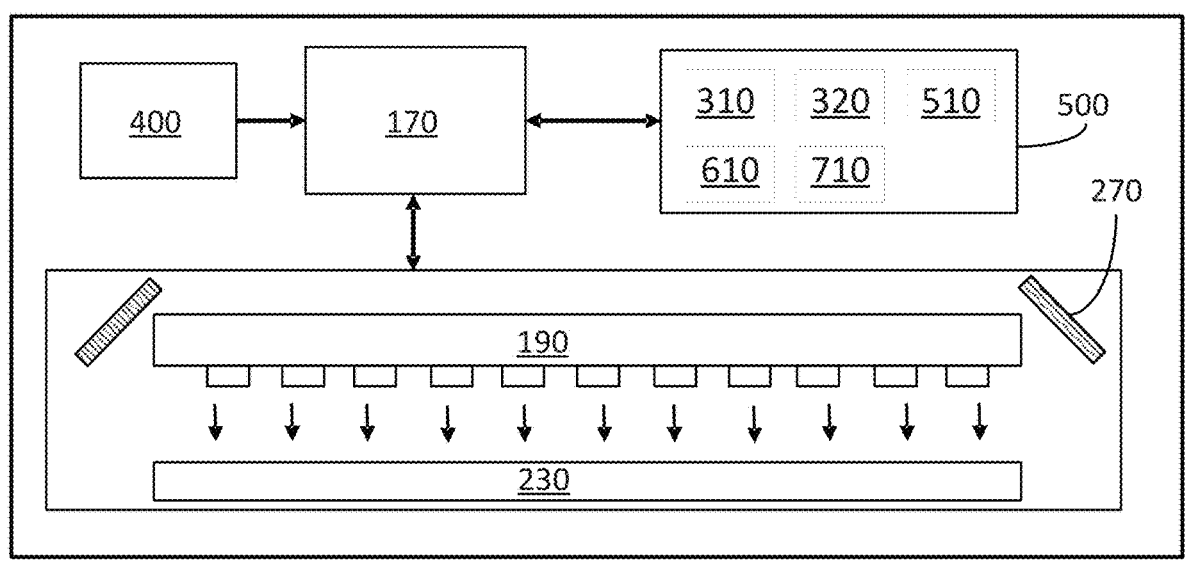
FIG. 7 is a schematic diagram illustrating portions of the UVC Unit that attribute to functionality of the Unit.
Figure 8:
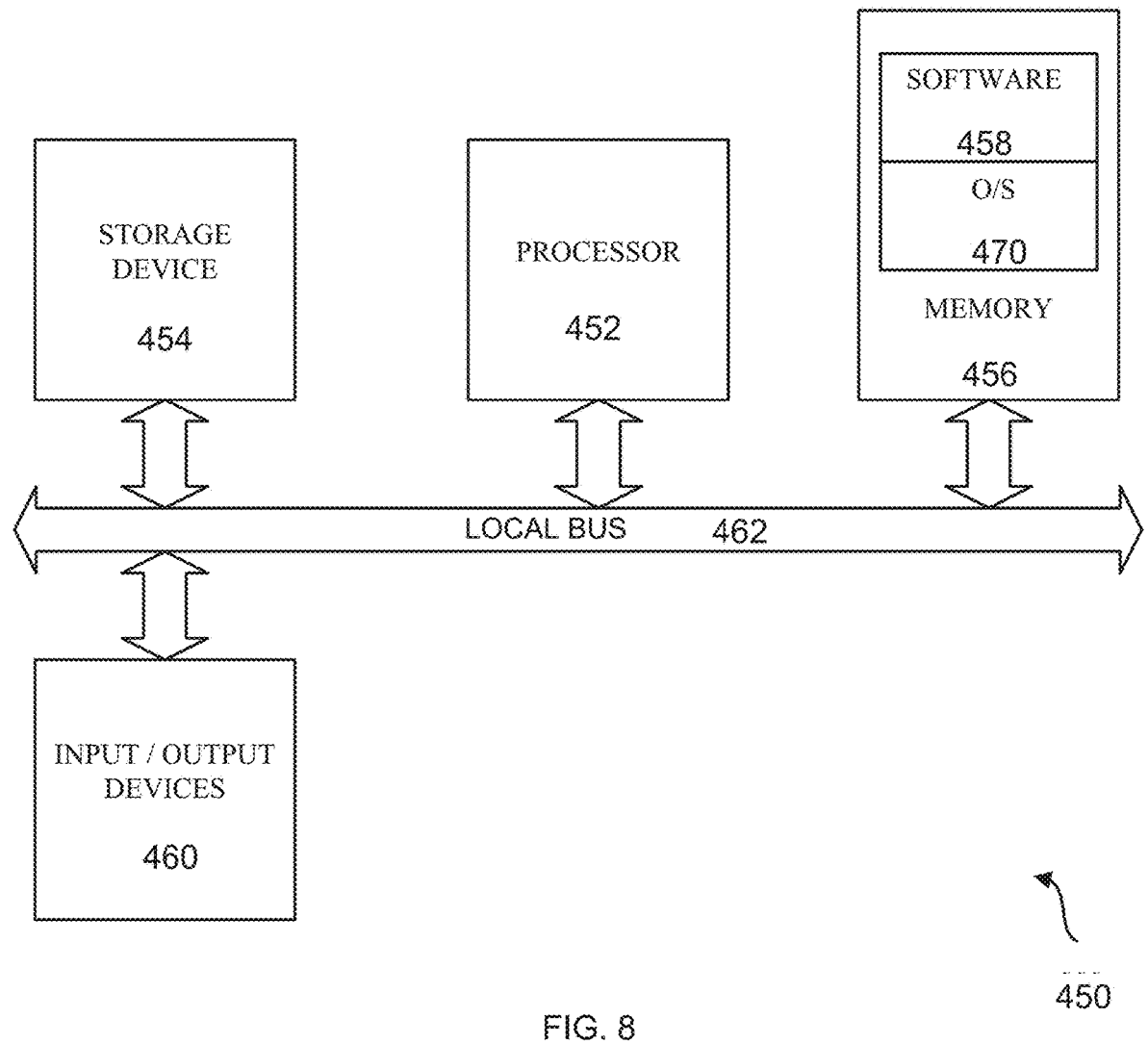
FIG. 8 provides a sample of a computer that may be located within the UVC Unit in accordance with an embodiment of the invention.

FIG. 7 is a schematic diagram illustrating portions of the UVC Unit 100 that attribute to functionality of the Unit 100. As shown by FIG. 7, the UVC Unit 100 contains a power source 400 which may either be internal to the UVC Unit 100 or may be a connection to an external power source such as a power cord connected to an internal converter to take received power from an outlet and convert it into a form usable by the UVC Unit 100, as is performed by known converters. The UVC Unit 100 also contains a processor 450 or computer. A sample of a computer in accordance with an embodiment of the invention is shown by FIG. 8, which will be described in further detail hereinbelow. The processor 450, or computer, provides the functionality to be performed by the UVC Unit 100, as will be described in detail with regard to the flowchart of FIG. 10. To perform functions of the processor 450, or computer, the processor 450 or computer uses data received from sensors, including the presence/motion sensor 310, distance ranging sensor 320, angular sensor 510, the CO2 sensor 610, and the temperature sensor 710. It is noted that while different figures of the present disclosure show the sensors in different locations, FIG. 7 places them on the same sensor block 500. As previously mentioned, different sensors may be located in different locations and such locations are not intended to be limited by the figures, but instead, such locations should be provided so as to allow for proper functionality of the sensor itself, as would be understood by one having ordinary skill in the art.

The processor 450 or computer considers the data received from the sensors and communicates with the LED module 190 to either turn on or off. Initiation of the LED module 190 results in UVC light being emitted by the LED module 190 to the lens 230. Functionality of the UVC Unit 100 is described in greater detail with regard to the flowchart of FIG. 10.

As previously mentioned, functionality performed by the UVC Unit 100 may be defined by a computer, an example of which is shown in the schematic diagram of FIG. 8. The computer 450 contains a processor 452, a storage device 454, a memory 456 having software 458 stored therein that defines the functionality of the UVC Unit 100 described herein, input and output (I/O) devices 460 (or peripherals or control buttons, such as a control panel), and a local bus, or local interface 462 allowing for communication within the computer 450. The local interface 462 can be, for example but not limited to, one or more buses or other wired or wireless connections, as is known in the art. The local interface 462 may have additional elements, which are omitted for simplicity, such as controllers, buffers (caches), drivers, repeaters, and receivers, to enable communications. Further, the local interface 462 may include address, control, and/or data connections to enable appropriate communications among the aforementioned components.

The processor 452 is a hardware device for executing software, particularly that stored in the memory 456. The processor 452 can be any custom made or commercially available single core or multi-core processor, a central processing unit (CPU), an auxiliary processor among several processors associated with the present computer 450, a semiconductor-based microprocessor (in the form of a microchip or chip set), a macroprocessor, or generally any device for executing software instructions.

The memory 456 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 456 may incorporate electronic, magnetic, optical, and/or other types of storage media. Note that the memory 456 can have a distributed architecture, where various components are situated remotely from one another, but can be accessed by the processor 452.

The software 458 defines functionality performed by the computer 450, in accordance with the present invention. The software 458 in the memory 456 may include one or more separate programs, each of which contains an ordered listing of executable instructions for implementing logical functions of the computer 450, as described below. The memory 456 may contain an operating system (O/S) 470. The operating system essentially controls the execution of programs within the computer 450 and provides scheduling, input-output control, file and data management, memory management, and communication control and related services.

The I/O devices 460 may include input devices, for example but not limited to, a control panel, wireless keyboard or mouse, etc. Furthermore, the I/O devices 460 may also include output devices, for example but not limited to, a printer, display, etc. Finally, the I/O devices 460 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the computer 450 is in operation, the processor 452 is configured to execute the software 458 stored within the memory 456, to communicate data to and from the memory 456, and to generally control operations of the computer 450 pursuant to the software 458, as explained with reference to the flowchart of FIG. 10.

When the functionality of the computer 450 is in operation, the processor 452 is configured to execute the software 458 stored within the memory 456, to communicate data to and from the memory 456, and to generally control operations of the computer 450 pursuant to the software 458. The operating system 470 is read by the processor 452, perhaps buffered within the processor 452, and then executed.

When the computer 450 is implemented in software 458, it should be noted that instructions for implementing the computer 450 can be stored on any computer-readable medium for use by or in connection with any computer-related device, system, or method. Such a computer-readable medium may, in some embodiments, correspond to either or both the memory 456 or the storage device 454. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 452 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the computer 450 is implemented in hardware, the computer 450 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 9:
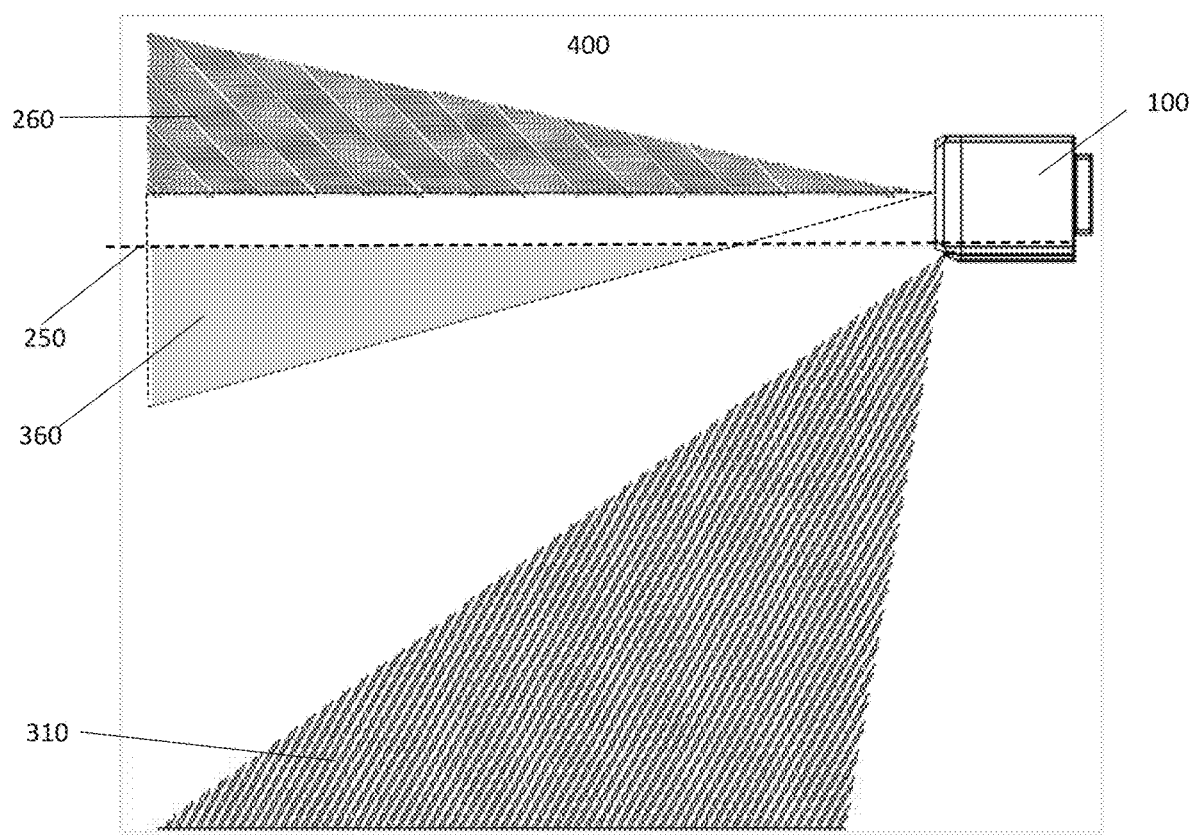
FIG. 9 is a schematic diagram illustrating emission and sensing ranges and zones of the UVC Unit.

An example of emission and sensing ranges and zones is illustrated by FIG. 9. Referring to FIG. 9, the UVC Unit 100 has a horizon 250. The UVC/RBG emission 260 direction and zone are illustrated, emitting from the UVC Unit 100, out of the window side of the Unit 100, and progressing horizontally and slightly upward from the horizon. An example of the detection region of the presence/motion sensor 340 is show by FIG. 9 as well. As shown, the presence/motion sensor 340 detection region is downward and slightly angled forward. It is noted, however, that the presence/motion sensor 340 may be positioned differently in accordance with how a user or manufacturer wishes the UVC Unit 100 to detect motion within a room. FIG. 9 also illustrates stray light 360 emitted from the UVC Unit 100. Stray light is any UVC light that passes below the horizon of the UVC Unit 100. If the light is in excess of the safety threshold based on the wavelength of light emitted, it can be hazardous to the occupants of the room. As a result, the present UVC unit 100 places the baffle 180 along the optical axis to prevent stray light from being emitted from the UVC Unit 100. A level sensor may also be provided to prevent the Unit 100 from being angled too far downward.

Figure 10:
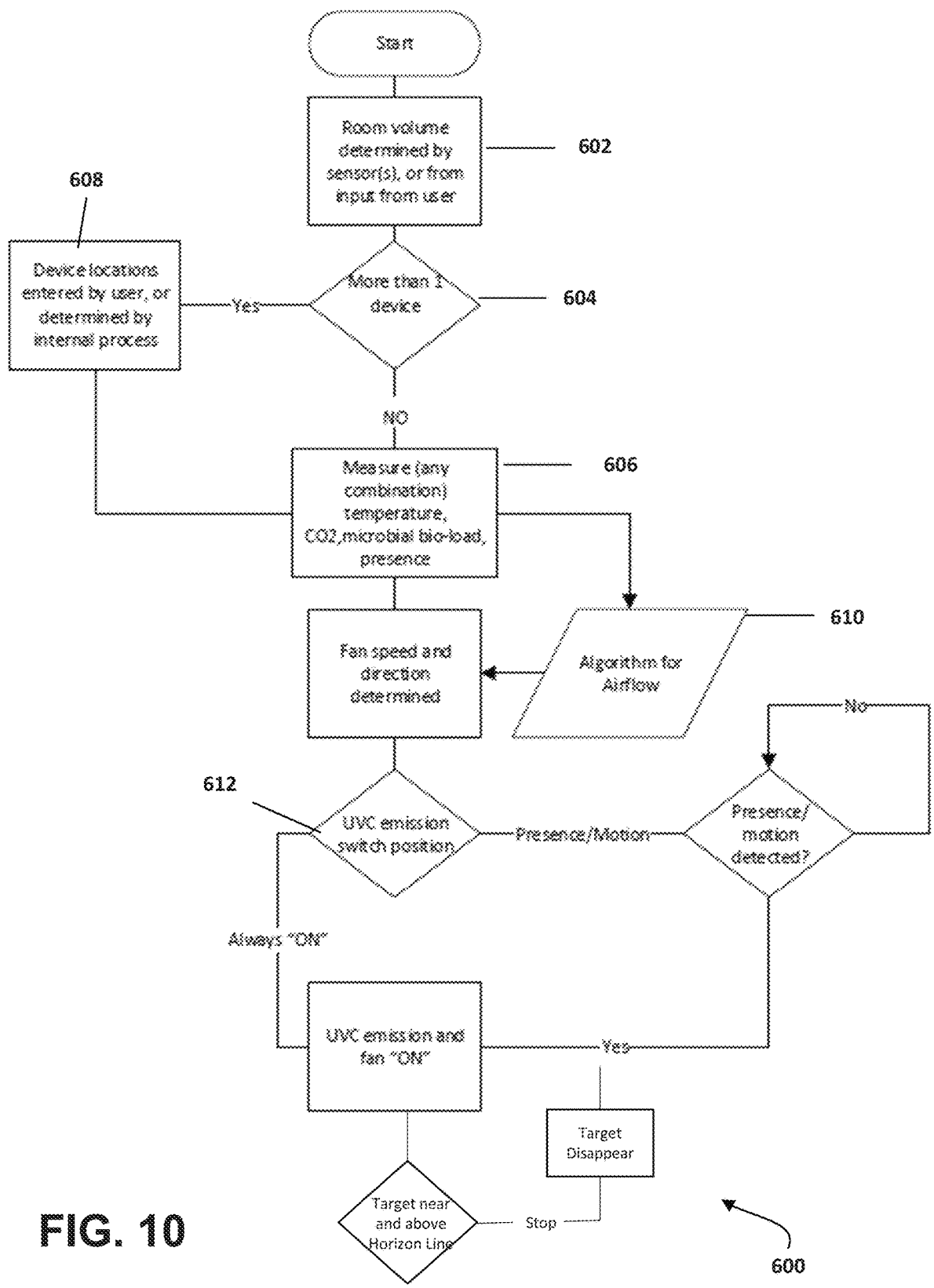
FIG. 10 is a flowchart illustrating functionality to be performed by the UVC Unit.

FIG. 10 is a flowchart 600 illustrating steps performed by the UVC Unit 100. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 602, the UVC Unit 100 first determines volume or square footage of the room in which the Unit 100 is positioned. As previously mentioned, this determination is performed by sensors of the UVC Unit 100, namely, the optical distance ranging sensor 320. Alternatively, a user of the UVC Unit 100 may enter dimensions of the room directly into the UVC Unit 100, via use of a keyboard, cell phone, or other input device for the computer of the UVC Unit 100. Since one having ordinary skill in the art would know how cell phone applications and separate computer software can allow a user of the UVC Unit 100 to communicate and interact with the UVC Unit 100 computer, further description of the same is not provided herein.

As shown by block 604, a determination is then made as to whether there is more than one UVC Unit 100 within the same room. Such a determination can be done by receiving input from a user of the UVC Unit 100 or by using an optional detection system within the Unit 100 that is capable of detecting location of another UVC Unit 100 via one or more of many different technologies, such as, but not limited to, RFID tags, Bluetooth, and detection within a local area network.

As shown by block 606, if there is only one UVC Unit 100 within the room, the UVC Unit 100 measures temperature of the LED module 190 via the temperature sensor 710, and presence of individuals within the room via use of CO2 levels in the room using the CO2 sensor 610 and individual detection using the presence/motion sensor 310. Not only can the CO2 sensor 610 and presence/motion sensor 310 determine if an individual is within the room, but also where the individual is located within the room.

As shown by block 608, if there are more than one UVC Units within the room, Unit locations are determined, or such information is prompted and received from a user, after which the LED module temperature and presence of individuals are determined (block 606).

As shown by block 610, the computer 450 then determines from data received from the sensors where within the room UVC light can be emitted. Specifically, the computer 450 takes into account whether the room is populated, the number of people in the room, and dimensions of the room to determine whether to move the baffle 180 via the baffle engine so as to move UVC light upward or downward. There may be different modes of the UVC Unit 100, resulting in different actions performed by the UVC Unit 100. As previously mentioned, there is an occupancy on mode of the UVC Unit 100 in which the Unit 100 remains on when it detects at least one occupant in the room. There is also an occupancy off mode where the Unit 100 turns off if an occupant enters the room and it remains off while the room is occupied, turning on when the occupant leaves. Finally, the Unit 100 may be in an always on mode where the Unit 100 is on regardless of whether the room is occupied or not. Since sensors of the UVC Unit 100 allow the Unit 100 to determine where occupants are located within the room, the UVC Unit 100 may also project UVC light only within areas of a room not currently occupied. This is because the determination of occupant location can be performed in real-time. Movement of the baffle 180 can be performed in accordance with the location in which there is a desire to project UVC light by taking dimensions and size of the room, current occupant location, and projecting UVC light into the region of the room that is not currently occupied after calculating where those regions are.

Determination of where to emit UVC light, which is determined by use of data from the sensors, may be performed using known algorithms (block 610), as well as determining direction for the UVC light, in accordance with position of the baffle 180 (block 612).

While not vital to the present system and method, the present UVC Unit 100 may contain a UV photodiode, or sensor, for monitoring output power/life of UVC LEDs so as to be aware of when to replace the LEDs. In addition, the Unit 100 may contain a temperature sensor or multiple temperature sensors for detecting LED temperature in order to monitor the LED module 190 and minimize chances of overheating LEDs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. An ultraviolet C (UVC) unit, comprising:
a Light Emitting Diode (LED) module containing a series of UVC LEDs that provide UVC emission;
a lens that linearly focuses the UVC emission of the LED module; and
a controllable baffle that directs UVC light that has passed from the LED module and through the lens,
wherein UVC light emitted from the LED module is directed toward the lens for linearly focusing the UVC emission of the LED module in order to propagate the UVC light toward a top portion of a room in which the UVC unit is positioned when the controllable baffle is in a first position, and wherein the UVC light is propagated downward from the UVC unit when the controllable baffle is in a second position; and
wherein the controllable baffle is on a baffle motor system so that when the baffle motor system rotates, it lifts the controllable baffle upwards so that what was formerly positioned as a top of the controllable baffle is then positioned at a bottom of the controllable baffle.

2. The UVC unit of claim 1, wherein the lens is a single cylindrical lens.

3. The UVC unit of claim 1, where in the lens is held along a length of the LED module.

4. The UVC unit of claim 1, wherein at least one reflector is positioned to at least partially surround at least a portion of the lens so as to direct the UVC light out of the UVC unit.

5. The UVC unit of claim 1, wherein the UVC unit contains a switch that allows a user to select between one of the group consisting of an occupancy on mode, an occupancy off mode, and an always on mode.

6. The UVC unit of claim 4, wherein the LED module, lens, at least one reflector, and controllable baffle are located within an optics box having a window for allowing propagated light to pass through.

7. The UVC unit of claim 1, wherein the LED module further comprises a series of RBG LEDs, which are turned on with the UVC LEDs so as to project visible light into the room so as to allow potential and current occupants of the room to know that the UVC unit is on and emitting UVC light.

8. The UVC unit of claim 1, further comprising a heat sink located on a back portion of the LED module.

9. The UVC unit of claim 8, wherein the heat sink includes fins that extend outward and away from the lens allowing heat of the LED module to be distributed and dissipate.

10. The UVC unit of claim 1, wherein the lens is held along a length of the LED module.

11. The UVC unit of claim 1, wherein the controllable baffle contains reflective characteristics on a top portion that allows for reflection of the UVC light to reflect downward from a horizon of the UVC unit, while a bottom portion of the controllable baffle contains absorbing properties that minimize stray light so as to increase efficiency of the UVC unit.

12. The UVC unit of claim 1, further comprising an angular sensor for determining if the UVC unit is angled downward from its position of installation.

13. The UVC unit of claim 1, further comprising a presence/motion sensor that determines if a person is occupying a room in which the UVC unit is located, as well as where in the room the person is located.

14. The UVC unit of claim 1, further comprising a presence/motion sensor that determines and turns UVC LEDs off if a person or a part of a body is occupying a zone or area of UVC emission.

15. The UVC unit of claim 1, further comprising a CO2 sensor that determines a number of people occupying a room in which the UVC unit is located.

16. The UVC unit of claim 1, further comprising an optical distance ranging sensor that allows the UVC unit to determine size and dimensions of a room in which the optical distance ranging sensor is located, wherein the UVC unit also includes a processor that uses the determined size and dimensions of the room and determines how much UVC light is necessary to disinfect the room, and controls the UVC unit accordingly.

17. The UVC unit of claim 6, wherein the at least one reflector surrounds a portion of the lens so as to efficiently reflect UVC light from the lens away from the at least one reflector, forward and out of the optics box.

* * * * *